United States Patent [19]

Thaler et al.

[11] Patent Number: 5,396,503
[45] Date of Patent: Mar. 7, 1995

[54] METHOD AND SYSTEM FOR COMMUNICATING DATA

[75] Inventors: Patricia A. Thaler, Carmichael, Calif.; Jonathan Jedwab, Bristol, England

[73] Assignee: Hewlett-Packard Company, Palo Alto, Calif.

[21] Appl. No.: 20,038

[22] Filed: Feb. 19, 1993

[51] Int. Cl.⁶ .................... G06F 11/00; H03M 13/00
[52] U.S. Cl. ......................................... 371/55; 370/18; 375/260
[58] Field of Search .................. 371/55, 48, 8.1, 11.1, 371/47.1, 57.2, 32, 33, 68.2; 370/37, 53, 77, 85.1, 94.1, 95.1, 58.1, 99, 79, 80, 112, 18; 375/17, 18, 36, 38, 75, 121; 395/200, 375, 325; 364/134, 222.2, 241.2, 232.7

[56] References Cited

U.S. PATENT DOCUMENTS

| | | | |
|---|---|---|---|
| 4,117,277 | 9/1978 | van den Elzen et al. | 179/170.6 |
| 4,123,710 | 10/1978 | Stuart et al. | 325/38 A |
| 4,270,203 | 5/1981 | Collins et al. | 370/102 |
| 4,383,316 | 5/1983 | Seidel | 370/118 |
| 4,594,707 | 6/1986 | Merritt et al. | 370/91 |
| 4,611,326 | 9/1986 | McNamara | 371/47 |
| 4,775,987 | 10/1988 | Miller | 375/38 |
| 4,805,194 | 2/1989 | Wesolowski | 375/75 |
| 4,933,930 | 6/1990 | Lien et al | 370/18 |
| 4,980,897 | 12/1990 | Decker et al. | 375/38 |
| 5,121,391 | 6/1992 | Paneth et al. | 370/95.1 |
| 5,255,287 | 10/1993 | Davies et al. | 375/17 |

FOREIGN PATENT DOCUMENTS 1540617 2/1979 United Kingdom .
2191662 12/1987 United Kingdom .
1250908 10/1991 United Kingdom .

OTHER PUBLICATIONS

Henri Nussbaumer, *Computer Communication Systems*, Translated by John C. C. Nelson, John Wiley & Sons, England, 1990, p. 243.

Primary Examiner—Charles E. Atkinson
Assistant Examiner—Dieu-Minh Le
Attorney, Agent, or Firm—Douglas L. Weller

[57] ABSTRACT

Data to be communicated over a plurality of channels is divided into blocks (A1,B1,C1,D1,A2,B2, ... ), and each successive block is transmitted along a different channel (A,B,C,D) on a cyclic basis. A 5-to-6 bit coding scheme is used with some data values having one possible encoding, with three binary ones, and the remainder having two possible encodings, one with two binary ones and the other with four binary ones. To maintain d.c. balance on each channel, two-ones and four-ones encodings are used alternately for successive occurrences on a channel of any data value having dual encodings. To assist detection of single-bit errors affecting the encoded data, a delimiter having one of two possible values is sent after the final block on each channel; this delimiter value is chosen in accordance with which encoding would have been selected if another dual-encoding data value had occurred on that channel.

16 Claims, 4 Drawing Sheets

Fig.3

| 5-bit data word | 6-bit code | |
|---|---|---|
| 00000 | 001100 | 110011 |
| 00001 |  | 101100 |
| 00010 | 100010 | 101110 |
| 00011 |  | 001101 |
| 00100 | 001010 | 110101 |
| 00101 |  | 010101 |
| 00110 |  | 001110 |
| 00111 |  | 001011 |
| | | |
| 01000 |  | 000111 |
| 01001 |  | 100011 |
| 01010 |  | 100110 |
| 01011 | 000110 | 111001 |
| 01100 | 101000 | 010111 |
| 01101 |  | 011010 |
| 01110 | 100100 | 011011 |
| 01111 |  | 101001 |
| | | |
| 10000 | 000101 | 111010 |
| 10001 |  | 100101 |
| 10010 | 001001 | 110110 |
| 10011 |  | 010110 |
| 10100 |  | 111000 |
| 10101 | 011000 | 100111 |
| 10110 |  | 011001 |
| 10111 | 100001 | 011110 |
| | | |
| 11000 |  | 110001 |
| 11001 |  | 101010 |
| 11010 | 010100 | 101011 |
| 11011 |  | 110100 |
| 11100 |  | 011100 |
| 11101 |  | 010011 |
| 11110 | 010010 | 101101 |
| 11111 |  | 110010 |

METHOD AND SYSTEM FOR COMMUNICATING DATA

TECHNICAL FIELD

This invention relates to methods and systems for communicating data, and particularly, though not exclusively, to methods and systems for communicating data over a plurality of channels, such as a cable having a plurality of conductors (for example a four-wire telephone cable).

BACKGROUND ART

The spread of personal computers and workstations has led to the development of networks for interconnecting such equipment and common resources such as printers and data storage devices. More powerful and sophisticated computing equipment and programs have progressively become available, allowing the processing of data in larger and larger quantities, for example in the form of database information and graphic images. These developments have in turn placed increasing demands on the speed and capacity of networks.

Various new networking technologies have been proposed to cater for these demands. One such technology is the fibre distributed data interface (FDDI), which is based on the use of optical fibres and optical signals. However, practical experience has shown that although this technology can provide the required performance, it is relatively expensive, requiring the costly process of installing complete new networks of optical fibre, which is itself inherently expensive.

Accordingly attention has also been directed to the possibility of transferring data at high speed over existing wiring installations, thereby avoiding the cost of installing a new network and gaining additional return for the expense previously incurred in installing the existing wiring.

One possible technique along these lines involves the use of unshielded twisted-pair (UTP) telephone cables of the kind already used for lower-speed local-area networks. In this technique, described for example in U.S. Pat. No. 5,119,402, the required high data rate is achieved by transferring the data over multiple conductors, so that different portions of the data are transmitted simultaneously over respective conductors.

In data communication systems it is desirable to ensure a high degree of error detection. One particular class of errors is those affecting individual, spaced bits. Such errors are known as single-bit errors. Various techniques have been developed for the detection of single-bit errors, including cyclic redundancy check (CRC) codes and the encoding of data values using a limited number of valid code words. However, there remain certain combinations of single-bit errors which such techniques may not detect.

It is an object of this invention to provide a method and system for communicating data, for example using cables with multiple conductors, which facilitates the detection of single-bit errors.

DISCLOSURE OF INVENTION

According to one aspect of this invention there is provided a method for communicating encoded data over a channel, using a code having two groups of data values, each data value in a first group having one or more code words all of weight n (weight being calculated as described below), and each data value in a second group having a plurality of code words each of which is of weight $n+x$ (e.g. $n-1$) or $n+y$ (e.g. $n+1$) and having at least one code word of each weight, code words of weight $n+x$ and $n+y$ being selected alternately upon each occurrence of any data value in said second group, wherein communication of data over said channel is terminated with a delimiter selected from at least two predetermined delimiters in accordance with the weight which would be selected for a code word corresponding to a data value in said second group and occurring in place of said delimiter.

Digital data is commonly communicated physically by transmitting different respective voltages for different digital values. Thus, in a binary system $+2.5$ volts may represent a binary 1 and $-2.5$ volts may represent a binary 0; in a ternary (three-level) system $+2.5$ volts may represent a ternary 1, 0 volts may represent a ternary 0, and $-2.5$ volts may represent a ternary $-1$. In an a.c. coupled communication system it is generally desired to maintain d.c. balance, i.e. to avoid any long-term departure of cumulative signal voltage from an equilibrium value. This may be accomplished by the use of a code in which the cumulative weight (as described below) of the code words does not depart from some predetermined value by more than some predetermined limit.

As used herein, the term 'weight' refers to the relative numbers of differently valued symbols in a code word. Thus, in a binary system, the weight may refer to the number of binary 1's in a code word relative to some reference quantity. For example, a code word 111000 may be considered to have a weight (expressed as number of 1's above or below three) of 0, a code word 001100 to have a weight of $-1$ and a code word 110011 to have a weight of $+1$.

In a ternary system, the weight may be expressed, for example, as the sum of the symbol values in a code word, the three possible symbol values being $-1$, 0 and $+1$.

According to another aspect of this invention there is provided apparatus for communicating encoded data over a channel, using a code having two groups of data values, each data value in a first group having one or more code words all of weight n, and each data value in a second group having a plurality of code words each of which is of weight $n+x$ or $n+y$ and having at least one code word of each weight, comprising:

means for encoding data values in said first group;

means for selecting code words of weight $n+x$ and $n+y$ alternately upon each occurrence of any data value in said second group; and means for terminating communication of data over said channel with a delimiter selected from at least two predetermined delimiters in accordance with the weight which would be selected for a code word corresponding to a data value in said second group and occurring in place of said delimiter.

BRIEF DESCRIPTION OF DRAWINGS

A method and system in accordance with this invention for communicating data using four-conductor unshielded twisted-pair cable will now be described, by way of example, with reference to the accompanying drawings, in which:

FIG. 3 is a table of five-bit data values and corresponding six-bit code values;

BEST MODE FOR CARRYING OUT THE INVENTION, & INDUSTRIAL APPLICABILITY

The present invention may be used, for example, in circumstances where a stream of data is communicated over a plurality of channels, successive portions of the data stream being communicated simultaneously over different respective channels in order to obtain a higher bandwidth than would be possible if all the data were transmitted over a single such channel. For convenience the invention will be described in the context of transmission of binary data over a cable having four channels or conductors (e.g. four pairs of twisted wires). However, the invention is not limited to this particular number of channels nor to this type of channel nor to binary data. In practice the cable would, for example, form part of a network connecting many stations or nodes, such as personal computers, workstations, multi-user computers, printers or data storage units. Circuit devices associated with these stations would provide the necessary functions for assembling data and network operating information into frames or packets for transmission, for controlling access to the network and for transmitting and receiving physical signals on the cable (for example by differential signalling in the case of twisted-pair conductors). The present invention is independent of the particular details of these functions and may for example be implemented in conjunction with existing network technologies; since such technologies already incorporate known techniques for providing these functions, and the functions form no part of the present invention, they will not be described here.

Figure 1:
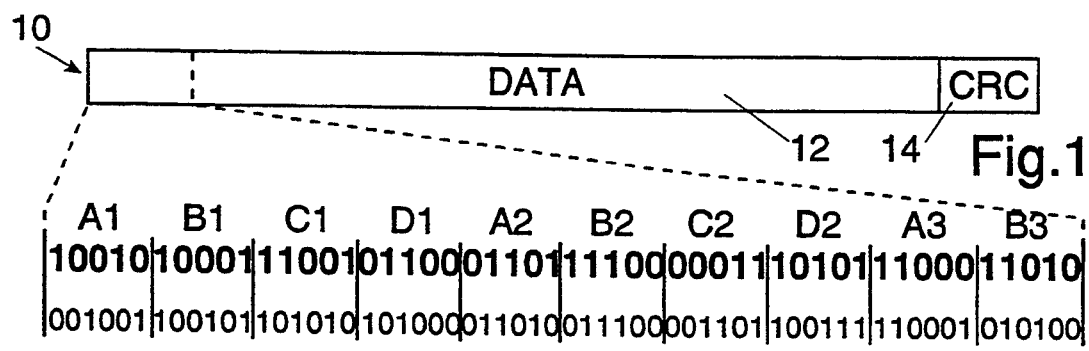
FIGS. 1 and 2 show the manner in which data is formatted for communication over the cable.
Figure 2:
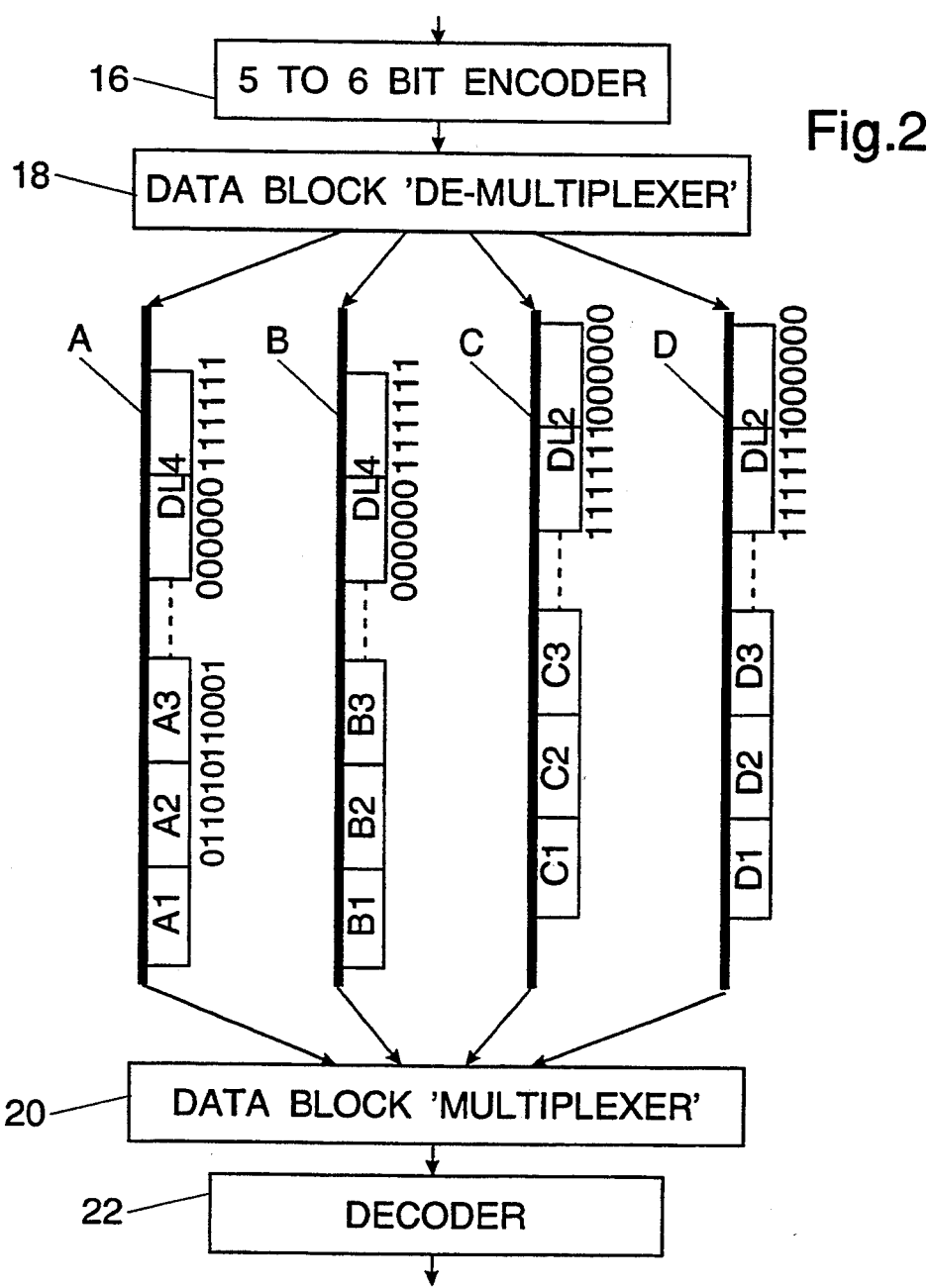

Referring to FIGS. 1 and 2, a data frame intended to be communicated over a four-conductor cable is shown schematically at 10. This frame comprises a binary digital message 12 to be transferred between stations on the network, and an associated thirty-two bit CRC (cyclic redundancy check) code block 14 containing check data derived from the message 12 in known manner in accordance with a predetermined CRC code algorithm, such as that based on the polynomial $$g(x)=x^{32}+x^{26}+x^{23}+x^{22}+x^{16}+x^{12}+x^{11}+x^{10}+x^{1}x^{7}+x^{5}+x^{4}+x^{2}+1.$$

For transmission over the four-conductor cable the data frame is split into consecutive blocks of five bits each, and the blocks are distributed among the four conductors (herein labelled A to D) on a cyclic basis. Thus the first block, labelled A1 in FIG. 1, is transmitted via conductor A, the next block (B1) via conductor B, the third block (C1) via conductor C and the fourth (D1) via conductor D. The cycle then repeats, with conductor A being used again, for the fifth block (A2), and so on.

Prior to actual transmission the five-bit data blocks are encoded by a 5-to-6 bit encoder 16 (FIG. 2) into six-bit values according to a substitution table, to provide a measure of inherent error detection. The encoding substitutions may be as shown in FIG. 3. These particular substitutions are selected in part to maintain d.c. balance on each conductor, by ensuring that after transmission of each coded data block the accumulated weight, as described above, is always in the range $-1$ to $+1$. Thus, in the example shown in FIG. 3, a first group of twenty substitutions (the centre column of the 6-bit code table) are assigned unique codes comprising respective ones of the twenty six-bit values which contain three binary zeroes and three binary ones (weight=0). The remaining twelve data values form a second group which are each assigned two possible six-bit code values, one containing two binary ones (weight=$-1$) and the other containing four (weight=$+1$), as shown in the left and right columns of the 6-bit code table.

The encoding is implemented so that on the first occasion in a frame that one of the second group of twelve data blocks occurs for transmission along a particular conductor, the corresponding two-ones encoding is selected (left-hand column); on the next occasion that any of these twelve data blocks occurs for transmission along that same conductor, the corresponding four-ones encoding is used (right-hand column); thereafter the use of the two-ones and four-ones encodings continues to alternate for each occurrence of any of the second group of data blocks in respect of that conductor. Thus for each conductor the numbers of two-ones and four-ones six-bit codes will differ at most by one, maintaining an average of three binary zeroes (zero weight) per six-bit code and providing the desired d.c. balance. In FIG. 1 illustrative five-bit data blocks are indicated in bold characters, and corresponding six-bit code values are indicated below them in normal characters.

The particular set of substitutions given in FIG. 3 is illustrative only; different combinations of five-bit data values and six-bit code values may be assigned as desired. Thus, for example, a code may be used in which there are two or more possible substitutions for every data value.

After encoding, the six-bit code values are distributed or 'de-multiplexed' by a de-multiplexer 18 among the four conductors A to D on a cyclic basis as described above. Thus, as shown in FIG. 2, conductor A will carry encoded data blocks A1, A2, A3, etc. in succession, conductor B will carry encoded data blocks B1, B2, B3, etc., and likewise for conductors C and D. To improve resistance to noise bursts, data blocks are transmitted on conductors A and B coincidentally (or, in terms of overall blocks, in phase with each other), and offset from (or out of phase with) the data blocks transmitted on conductors C and D.

At the end of each frame of data, a twelve-bit end delimiter is transmitted on each conductor. This delimiter has two possible values; one value, identified as DL2 in FIG. 2, has the binary value 111111000000; the other value, identified as DL4, has the binary value 000000111111. The particular values indicated are purely exemplary—they are chosen to be readily distinguishable from encoded data blocks, and values which maintain d.c. balance are preferred. The choice between these values for each conductor is determined by the weight of the code word most recently transmitted on that conductor for any one of the second group of twelve data values having two possible code values. If the most recently transmitted one of those data values was encoded with a code value having two binary ones (weight=$-1$), the DL4 delimiter is chosen; otherwise (or if no data value from the second group occurs during the frame on that conductor) the DL2 delimiter is used. (In the example shown in FIG. 2, it is assumed that no further data values from the second group occur after data value B3.)

At the receiving end of the conductors A to D, a multiplexer 20 'multiplexes' the four signals to reconstruct the original encoded data stream, after compensating for the offset between the the signals on conductors C and D and those on conductors A and B. A decoder 22 then converts each six-bit encoded block to derive the corresponding five-bit data block, and checks the CRC code. If the CRC code is invalid, or any invalid six-bit encoded value is encountered, or there is a violation for any conductor of the alternating pattern of encodings of weight +1 and −1 for data values in the second group, the decoder 22 rejects the entire data frame. Any departure from this alternating pattern, in encoded data values or in the end delimiter, indicates that at least one error has occured.

The consistent use of a predetermined (e.g. two-ones) encoding as the choice for the first occurrence on each conductor of one of the second group of data values, and selection of an end delimiter value as described above, provide several advantages. Thus, it is possible to detect reliably an odd number of single-bit errors occurring on one or more conductors; in addition, some occurrences of an even number of single-bit errors on every conductor are detected. Error patterns which will be detected in this manner include some which will escape detection using CRC codes and code violations. In particular, this invention, together with the code in FIG. 3 for example, allows the detection of any combination of three single-bit errors within a single frame.

Thus, if a single-bit error affects an encoded data block of weight 0, that data block will be changed either to an invalid code value, or to one of the valid code words of weight +1 or −1. The first possibility is inherently and immediately detectable as being an error; the second will cause an extra occurrence of a code word of weight +1 or −1, thereby disrupting the regular alternating pattern of encodings of weight +1 and −1, and so will also be detectable.

If a single-bit error affects an encoded data block of weight +1 or −1, it will likewise be changed either to an entirely invalid code word of weight +2 or −2, or to a code word of weight 0. The first possibility is again inherently detectable as an error; the second will cause one occurrence of a code word of weight +1 or −1 to disappear, again disrupting the regular alternating pattern.

Figure 4:
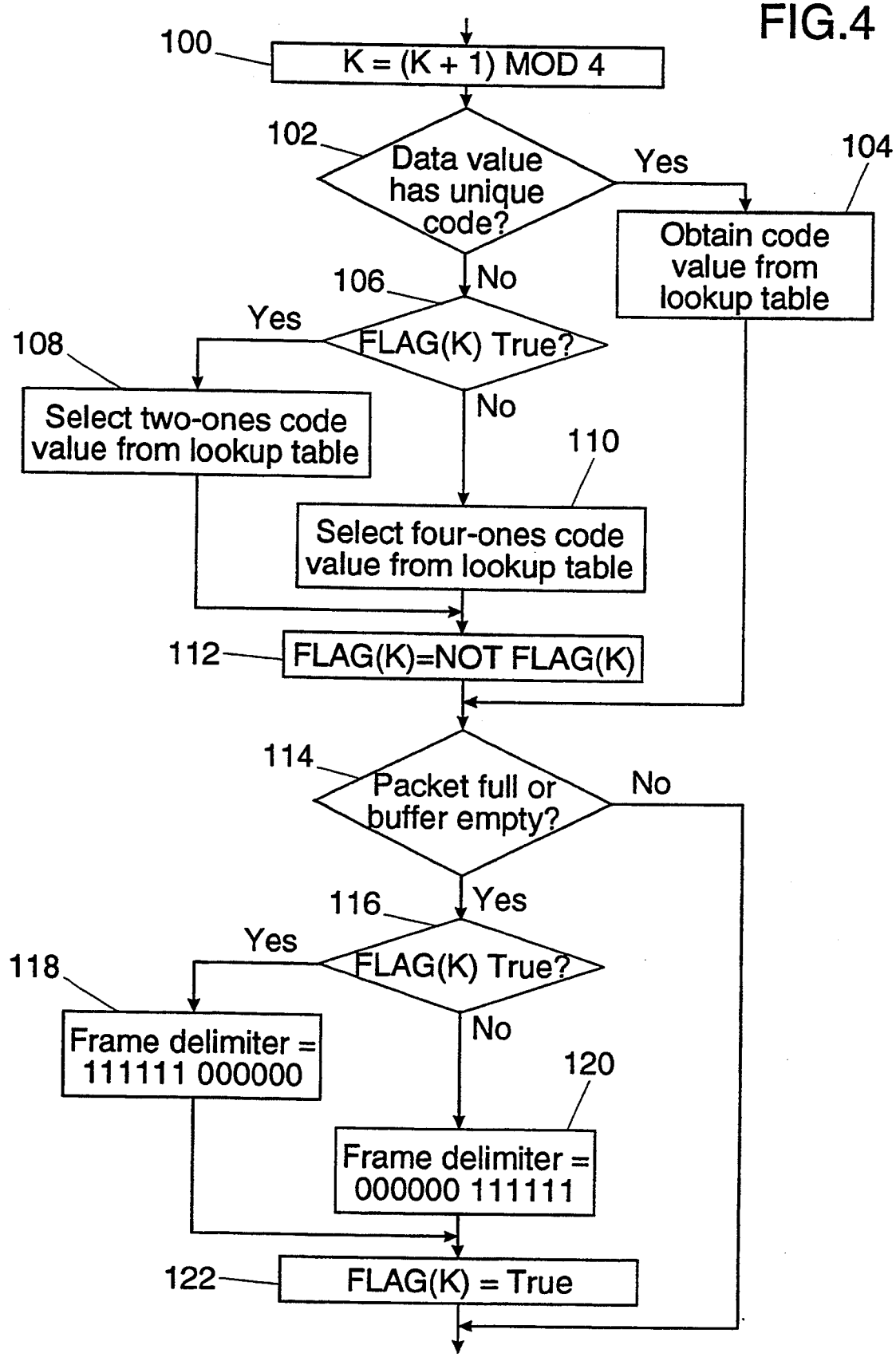
FIG. 4 is a flow diagram of a method for encoding data blocks according to the table in FIG. 3, and for delimiting data.

FIG. 4 shows a flow diagram of a method for implementing the encoding and choice of end delimiter. This procedure uses four boolean flags, one for each conductor, which are set to 'true' at the start of each frame.

Referring to FIG. 4, at step 100 a counter K is incremented according to the relationship $$K = (K+1) \text{ modulo } 4$$

so that the counter cyclically takes on the values zero to three inclusive. The purpose of this counter is to keep track of which conductor the current (encoded) data value will be transmitted along. At step 102 the data value to be encoded is tested to check whether it has one or two corresponding six-bit code values. If there is a unique corresponding code value, the procedure obtains that value from a look-up table at step 104 and advances to step 114, described below. Otherwise the procedure advances to step 106, where one of the above-mentioned boolean flags, selected in accordance with the current value of the counter K, is tested. If the flag is 'true', the procedure selects the code value containing only two binary ones, at step 108; if the flag is 'false' the code value containing four ones is selected, at step 110. In either case the procedure then inverts the value of the flag at step 112.

At step 114 the procedure tests whether the current frame is full (i.e. the prescribed maximum size for a frame has been attained) and whether a data buffer from which data is taken for encoding is empty. If neither of these circumstances applies, the procedure exits for transmission of the encoded data block. If either test is satisfied, the current frame is completed and an end delimiter must be selected. Accordingly, at step 116, the relevant one of the above-mentioned four boolean flags, selected in accordance with the current value of the counter K, is tested. If the flag is 'true', the procedure selects the DL2 delimiter (111111000000), at step 118; if the flag is 'false' the DL4 delimiter (000000111111) is selected, at step 120. In either case the procedure then resets the value of the flag at step 122 to 'true' in preparation for the following frame.

Figure 5:
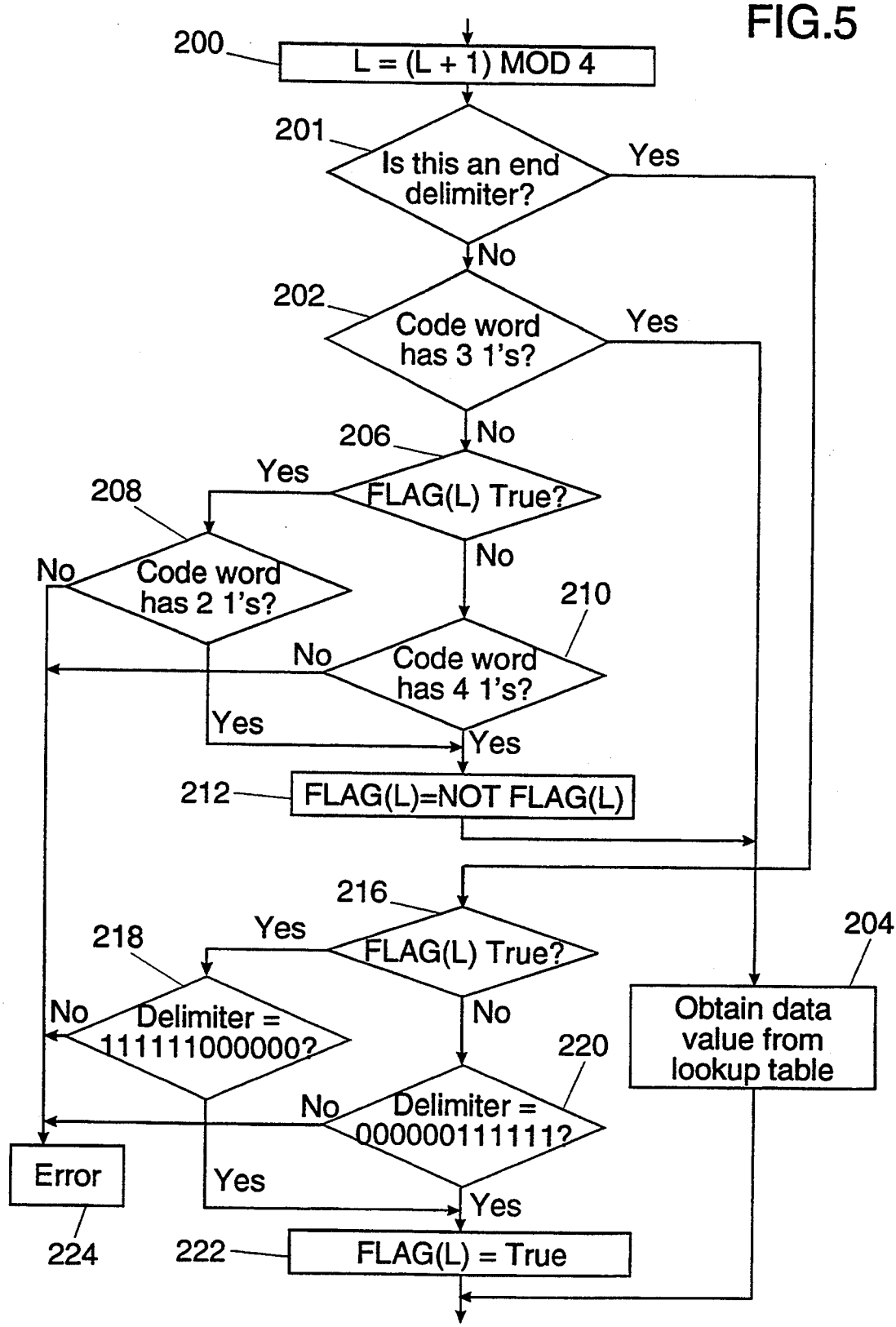
FIG. 5 is a flow diagram of a method for checking received encoded data blocks for errors.

FIG. 5 shows a procedure, similar to that of FIG. 4, for use in the decoder 22 to track the alternating pattern of encodings of weight +1, and −1, and verify that the pattern has been correctly maintained in the received data stream. Like the procedure in FIG. 4, this procedure uses four boolean flags, one for each conductor, which are set to 'true' at the start of each frame.

Referring to FIG. 5, at step 200 a counter L is incremented in a similar manner to the counter K in FIG. 4, to keep track of which conductor the current encoded) data value was transmitted along. The next step, 201, tests whether the current code value is the start of an end delimiter (111111 or 000000). If so, the procedure advances to step 216, described below. Otherwise, at step 202 the code value is tested to check whether it contains three binary 1's. If it does, the procedure obtains the corresponding data value from the look-up table at step 204. Otherwise the procedure advances to step 206, where one of the above-mentioned boolean flags, selected in accordance with the current value of the counter L, is tested. If the flag is 'true', the procedure advances to step 208 where the code value is tested to check whether it contains only two binary ones; if the flag is 'false' the code value is tested to check if it contains four ones, at step 210. If the selected test fails, the procedure indicates an error, at step 224. Otherwise the procedure inverts the value of the flag, at step 212, and then decodes the code value at step 204.

When an end delimiter is found, the relevant one of the four boolean flags, selected in accordance with the current value of the counter L, is tested at step 216. If the flag is 'true', the procedure tests whether the end delimiter has the DL2 value (111111000000), at step 218; if the flag is 'false' the delimiter is tested for the DL4 value 000000111111), at step 220. If the relevant test fails, the procedure indicates an error at step 224. Otherwise the value of the flag is reset at step 220 to 'true' in preparation for the following frame.

We claim:

1. A method for communicating encoded data over a channel using a code having two groups of data values, the method comprising the steps of:
   (a) encoding each data value in a first group of data values into a corresponding code word of weight n;

(b) encoding each data value in a second group of data values into one of a corresponding plurality of code words, a first of the corresponding plurality of code words being of weight $n+x$ and a second of the corresponding plurality of code words being of weight $n+y$, wherein x does not equal y;

(c) transmitting code words for data values in the second group over the channel so that when a most recently transmitted code word for a data value in the second group had a weight of $n+x$, a next to be transmitted code word for a data value in the second group will have a weight of $n+y$, and so that when the most recently transmitted code word for a data value in the second group had a weight of $n+y$, the next to be transmitted code word for a data value in the second group will have a weight of $n+x$; and, (d) terminating communication of data over said channel with a delimiter selected from at least two predetermined delimiters in accordance with the weight which would be selected for a code word corresponding to a data value in said second group and occurring in place of said delimiter.

2. The method of claim 1, wherein x has a value of $-1$.

3. The method of claim 1, wherein y has a value of 1.

4. The method of claim 1, wherein each data value in said first group has one code word, and each data value in said second group has one code word of weight $n+x$ and one code word of weight $n+y$.

5. The method of claim 1, wherein said data values are 5-bit data words which are encoded using the code words in the table of FIG. 3.

6. The method of claim 1, wherein said predetermined delimiter values are 111111000000 and 000000111111.

7. The method of claim 1, wherein data is transmitted over a plurality of channels, wherein communication of data over each respective channel is terminated with a delimiter selected from at least two predetermined delimiters in accordance with the weight which would be selected for a code word corresponding to a data value in said second group and occurring on that channel in place of said delimiter.

8. A method as in claim 1 wherein in step (a) each data value in the first group is encoded into its own unique corresponding code word of weight n so that each code word of weight n corresponds to, at most, one encoded data value.

9. Apparatus for communicating encoded data over a channel, using a code having two groups of data values, comprising:

means for encoding data values in a first group so that each data value in the first group is encoded to a corresponding code word of weight n;

means for encoding data values in a second group so that each data value in the second group is encoded into one of a corresponding plurality of code words, a first of the corresponding plurality of code words being of weight $n+x$ and a second of the corresponding plurality of code words being of weight $n+y$, wherein x does not equal y;

means for transmitting code words for data values in the second group over the channel so that when a most recently transmitted code word for a data value in the second group had a weight of $n+x$, a next to be transmitted code word for a data value in the second group will have a weight of $n+y$, and so that when the most recently transmitted code word for a data value in the second group had a weight of $n+y$, the next to be transmitted code word for a data value in the second group will have a weight of $n+x$; and means for terminating communication of a packet over said channel with a delimiter selected from at least two predetermined delimiters in accordance with the weight which would be selected for a code word corresponding to a data value in said second group and occurring in place of said delimiter.

10. The apparatus of claim 9, wherein x has a value of $-1$.

11. The apparatus of claim 9, wherein y has a value of 1.

12. The apparatus of claim 9, wherein each data value in said first group has one code word, and each data value in said second group has one code word of weight $n+x$ and one code word of weight $n+y$.

13. The apparatus of claim 9, wherein said data values are 5-bit words and including means for encoding said data values in accordance with the table of FIG. 3.

14. The apparatus of claim 9, wherein said predetermined delimiter values are 111111000000 and 000000111111.

15. The apparatus of claim 9, wherein data is transmitted over a plurality of channels, and including means for terminating communication of data over each respective channel with a delimiter selected from at least two predetermined delimiters in accordance with the weight which would be selected for a code word corresponding to a data value in said second group and occurring on that channel in place of said delimiter.

16. An apparatus as in claim 9 wherein the means for encoding data values in the first group encodes each data value in the first group into its own unique corresponding code word of weight n so that each code word of weight n corresponds to, at most, one encoded data value.

* * * * *